United States Patent [19]
Cha et al.

[11] Patent Number: 5,470,384
[45] Date of Patent: Nov. 28, 1995

[54] PROCESS FOR CO-RECYCLING TIRES AND OILS

[75] Inventors: Chang Y. Cha; Henry Plancher, both of Laramie, Wyo.; Lawrence S. Kraus, Elburn, Ill.

[73] Assignees: Univ. of Wyoming, Laramie, Wyo.; Amoco Corp., Chicago, Ill.

[21] Appl. No.: 342,517

[22] Filed: Nov. 21, 1994

Related U.S. Application Data

[62] Division of Ser. No. 140,378, Oct. 21, 1993, abandoned, which is a continuation of Ser. No. 117,387, Sep. 7, 1993, Pat. No. 5,389,691.

[51] Int. Cl.$^6$ ................................................. C09D 195/00
[52] U.S. Cl. ...................... 106/284.03; 106/273.1; 524/59; 524/64
[58] Field of Search ............... 126/284.03, 273.1; 524/59, 64

[56] References Cited

U.S. PATENT DOCUMENTS

| | | | |
|---|---|---|---|
| 3,896,059 | 7/1975 | Wakefield et al. | 521/41 |
| 4,052,344 | 10/1977 | Crane et al. | 521/44.5 |
| 4,301,137 | 11/1981 | Williams et al. | 585/240 |
| 4,384,150 | 5/1983 | Lyakhevich et al. | 521/41 |
| 4,982,027 | 1/1991 | Korff et al. | 585/241 |
| 5,264,640 | 11/1993 | Platz | 585/241 |

*Primary Examiner*—David Brunsman
*Attorney, Agent, or Firm*—John O. Mingle

[57] ABSTRACT

A thermal process co-recycles tires with oils to produce gases, liquids and solids. The latter consisting of glass and steel fibers and a carbonous residue which are separately segregated and collected. By using selected additives gas formation and hydrogen sulfide contents are reduced, light product oil yields and quality are maximized and the level of chlorinated substances in the oils are reduced to trace amounts. The carbonous residue makes an excellent modifier for improving performance properties of bituminous binders and bituminous mixtures and for providing added benefits to properties of Portland concrete.

15 Claims, 2 Drawing Sheets

PROCESS FOR CO-RECYCLING TIRES AND OILS

This application is a divisional of application Ser. No. 08/140,378, filed Oct. 21, 1993 now abandoned, which itself is a continuation of Ser. No. 08/117/,387, filed Sep. 7, 1993 now U.S. Pat. No. 5,389,691.

BACKGROUND OF INVENTION

1. Field of Invention

The present invention relates to a two-step thermal process for recycling scrap tires and waste or other oils with emphasis on the production of valuable products including overhead light oil, and gas and a carbonaceous material useful as a modifier for bituminous binders and Portland concrete.

2. Background

Upwards of 280 million tires are accumulated annually in the United States and about 65 percent are added to stockpiles, landfills or disposed of by other means. The Environmental Protection Agency estimates there are more than two billion discarded tires in this country. Accidental fires at storage sites have been a continuing environmental problem.

Waste motor and industrial oils also contribute to a hazardous waste disposal problem. An estimated 400 million gallons of waste motor oils are illegally dumped in landfills each year. Reprocessing waste oils to produce "new" recycled oils for the motoring public or industrial uses is not economically feasible because collection expenses and refining costs including waste disposal of residual oil sludge are too high and there is a lack of consumer acceptance for reprocessed oils.

A current scrap tire use is the making of crumb rubber modifier for asphalt cements and this consumes upwards of 1.8 million tires per year; however, in comparison to the supply, this is a minor use. Yet the concept of asphalt modification is a useful field to utilize the products from scrap or waste tire reprocessing.

Since more than 90 percent of the paved roads in the United States utilize asphalt, the potential for asphalt modifiers is great. Asphaltic concrete pavement failures traditionally have reasons associated with rutting, moisture-induced induced damage and embrittlement. Many asphalt modifiers have been proposed. See the classic Barth's *Asphalt*, Gordon and Breach, N.Y. 1962, for a discussion of a wide range of tests concerning modifiers. In particular carbon black modifiers have shown considerable success in reducing rutting and low temperature cracking difficulties. For more than a half a century the annual series *Asphalt Paving Technology*, Viking Press, Eden Prairie, Minn., summarizes much information on using various asphalt modifiers.

Asphalt when used for its intended purposes often suffers from premature failure due to factors such as aging, embrittlement, or loss of adhesion or cohesion properties. Much development has occurred to improve its performance and rheological properties. However in such instances, asphalt road life is still much less than desired. In recent years numerous advantages have been found for incorporating some form of rubber modifier into asphalt. The rubber gives the asphalt improved elastic behavior, increases its ductility, reduces is susceptibility to temperature changes, and in addition, can improve the surface life of roads.

In order to improve asphalt durability, many rubber-like polymers; such as neoprene, GRS rubbers, latex, nitrile rubber, butyl rubber, natural rubber, and others; have been blended, usually at a composition of a few percent, with asphalt in a conventionally mixing operation; see Barth referenced above.

Direct combustion processes use an estimated 25 million tires annually. Although tires have a high heating value of 15,000 BTU/lb, their economic value as a fuel diminishes because tires contain about 2.5 wt % sulfur. Facilities that use scrap tires as a supplemental fuel source often blend them with coal to keep sulfur pollutants in the stack gas within tolerable levels. Higher levels of sulfur pollutants would require stack gas clean-up which jeopardizes the economics of using tires as a fuel supplement. Further problems arise in combusting waste tires due to their fiber and wire, usually steel, content. Particularly shredded waste tires must overcome this fiber and wire tangling problem with processing machinery.

Pyrolysis, which normally implies thermal degradation at 900°–1400° F. in an inert atmosphere, has been tested both in the laboratory and in pilot-scale equipment to produce either hydrocarbon gases or oils plus a coke-like residue of carbon black. Direct pyrolysis of tires has a disadvantage in that gaseous products generally contain moderate levels of hydrogen sulfide and liquid products contain substantial amounts of chlorinated materials. The presence of chlorinated materials in the oil reduces its value as a refinery feed stock for hydrogenation and other processes. Even low levels of chlorinated materials in feed oils result in process corrosion problems in vessels and piping.

Although many forms of distress in asphaltic and concrete pavements have been identified and solutions sought, problems continue to exist either because the solutions are inadequate or because new variables causing distress manage to stay ahead of the research. Increased traffic and vehicular loads coupled with increased tire pressures have greatly contributed to pavement distress, reduced safety, and increased maintenance costs. These problems associated with permanent distortions, commonly referred to as rutting, in bituminous pavements are further compounded by the effects of moisture-induced damage or moisture sensitivity. Moisture damage, embrittlement, crack formation with adhesion loss between the bituminous binder and the mineral aggregates and rut formation are four major causes of pavement failures. A solution to any one of these problems would have a profound effect in increasing the service life of our roadways and simultaneously provide added benefits to the motoring public.

Surface areas covered with Portland concrete also experience similar forms of distress and high maintenance costs. Crack formation during drying and/or curing modes coupled with load induced failures contribute significantly to maintenance costs. Air encapsulation in Portland concrete increases porosity and permeability of the concrete which allows penetration of salts and water into the concrete structure thereby facilitating corrosion of the steel reinforcing structure. Portland concrete adheres poorly to oily metallic surfaces such as those found in sealing of oil wells. In frigid climates the natural deicing characteristics are inadequate simply because concrete is a poor absorber of solar energy.

Potential United States patents covering the above mentioned concepts include:

| No. | Inventor | Year |
| --- | --- | --- |
| 5,095,040 | Ledford | 1992 |
| 5,084,141 | Holland | 1992 |
| 5,070,109 | Ulick et al | 1991 |
| 5,060,584 | Sowards et al | 1991 |
| 5,041,209 | Cha-1 et al | 1991 |
| 4,983,782 | Mertz et al | 1991 |
| 4,983,278 | Cha-2 et al | 1991 |
| 4,960,440 | Betz | 1990 |
| 4,895,083 | McDilda | 1990 |
| 4,894,140 | Schon | 1990 |
| 4,867,755 | Majid et al | 1989 |
| 4,806,232 | Schmidt | 1989 |
| 4,787,321 | Schnellbacher et al | 1988 |
| 4,746,406 | Timmann | 1988 |
| 4,686,008 | Gibson | 1987 |
| 4,686,007 | Lyakhevich et al | 1987 |
| 4,647,443 | Apffel | 1987 |
| 4,560,414 | Kikegawa et al | 1985 |
| 4,515,659 | Wingfield et al | 1985 |
| 4,383,151 | Audibert et al | 1983 |
| 4,332,932 | Harada et al | 1982 |
| 4,250,158 | Solbakken et al | 1981 |
| 4,211,576 | Yan | 1980 |
| 4,166,049 | Huff | 1979 |
| 4,153,514 | Garrett et al | 1979 |
| 4,123,332 | Rotter | 1978 |
| 4,030,984 | Chambers | 1977 |
| 3,978,199 | Maruhnic et al | 1976 |
| 3,915,581 | Copp | 1975 |
| 3,907,582 | Walter | 1975 |
| 3,875,077 | Sanga | 1975 |
| 3,873,474 | Ficker | 1975 |
| 866,758 | Wheeler | 1907 |

Referring to the above list, Ledford disclosed rotary kiln processing of shredded tires with 1000° F. inlet and 800° F. outlet using indirect gas heating.

Holland disclosed waste tire processing by preheating and then microwaving. Microwave energy used to break carbon-carbon bond.

Ulick et al disclosed processing rubber tires using aromatic hydrocarbon oil at up to 600° F. Products obtained were a grease-like and putty-like material which were added to asphalt to improve low-temperature flow properties.

Sowards et al disclosed combusting shredded tires with limestone to control $SO_2$ emissions.

Cha-1 et al disclosed processing heavy oil using inclined screw pyrolysis reactors and obtaining light, middle and heavy distillates and asphalt binder. Limestone added to remove sulfur containing components from gases.

Mertz et al disclosed waste treatment of old tires with basic addition, such as lime, to trap acidic gases including $SO_2$, $NO_2$, and HCl.

Cha-2 et al disclosed processing oil shale, tar sand, waste motor oil, or waste tires for pyrolysis products with recycling of selected distillates. Pyrolysis temperature up to 800° F. Scrap tire process used inclined screw pyrolysis reactor and waste motor oil with magnetic separation of scrap metals. Screw reactors were symmetrically housed. Carbon black obtained used for asphalt modifier.

Betz disclosed producing pyrolysis gas from used tires with a fluidized bed. Sulfur cleanup was employed by adding a basic binder, such as calcium carbonate, hydrated lime, calcium oxide, magnesium carbonate, magnesium oxide, magnesium hydroxide, dolomite, sodium carbonate or sodium hydroxide.

McDilda disclosed combustion of tires and recovery of products from the gases.

Schon disclosed processing waste oil by itself.

Majid et al disclosed reduction of sulfur emission during combustion by the addition of limestone, lime or hydrated lime.

Schmidt disclosed desulfurization of $H_2S$ from used oil pyrolysis with basic additive and metal to catalyze $H_2S$ removal.

Schnellbacher et al disclosed apparatus for chopped old tire combustion using ash grate with rotating fingers and operating temperature of 150°–700° F.

Timmann disclosed a pyrolyzing system for tires to produce increased C-4 components by condensing light oil fraction at near 32° F.

Gibson disclosed apparatus for pyrolysis of shredded tires using partial flight screw with oil jet spray and temperature range employed was 1000°–1400° F.

Lyakhevich et al disclosed shredded tire processing at 150°–500° C. with solvent injection through nozzles.

Apffel disclosed carbon black from tires, no oil added, obtained using preheated steam and pyrolysis by hot gas at 2000° F.

Kikegawa et al disclosed asphalt modifier of Trinidad Epure with pulverulent solid, such as lime or gilsonite, for high temperature performance.

Wingfield et al disclosed catalyze pyrolytic conversion of waste rubber with basis salt, such as sodium carbonate, producing increased amount of $C_1$–$C_4$ olefinic materials including isobutylene.

Audibert et al disclosed heating whole tires in oven while spraying with hot heavy oil that was recycled. Temperature of operation was 350°–500° C. with 10:1 ratio of oil to whole tires.

Harada et al disclosed screw extruder for melted waste rubber at 400°–500° C. using no added oil.

Solbakken et al disclosed fragmented used tires pyrolyzed under vacuum with oxygen-limited. Main product was carbon black with tar refluxed. Reactor temperature range was 750°–1800° F. with pressure 1–20 psia.

Yan disclosed dissolving scrap tire rubber in thermally stable highly aromatic solvent with heating at 350°–850° F. until homogeneous and using as asphalt modifier.

Huff disclosed rubberized asphalt made from reclaimed rubber from scrap tires containing critically 30–40% second acidaffins.

Garrett et al disclosed process using shredded waste tires heated to 300°–2000° F. with desulfurization by adding solid sulfur acceptor, such as lime or iron oxide.

Rotter disclosed direct pyrolysis of shredded tires at 400°–900° C. by indirect oxygen-free combustion gas using equipment with staggered paddle-like impeller.

Chambers disclosed using hot gas at 600° F. for melting of whole scrap tires with a wet scrubber for gas cleanup. Carbon black produced at 1100° F. under vacuum conditions.

Maruhnic et al disclosed carbon black production from tires using aromatic solvent at 500°–700° F., 25–100 psig, and filter collection.

Copp disclosed carbon black reinforced polymer used as modifier for asphalt paving.

Walter disclosed asphalt modification with additives of lime and residue from refuse incinerator.

Sanga disclosed waste tire production for activated charcoal using limestone to produce CO atmosphere for product conversion of carbon to activated charcoal. Temperature of decomposition was 400°–800° C.

Ficker disclosed comminuted scrap rubber through heated feed screws at 140°–300° C. using differential gearing with interleaved helical threads; one with twice the pitch.

Wheeler disclosed reclaiming scrap rubber with superheated steam at 600° F.

Foreign patents of interest include Lengd, SU 0644802, 1979, who disclosed making asphalt with the addition of limestone powder and shale processing residue. Yarosl, SU 0979125, 1982, disclosed using zinc oxide with rubber to improve solubility in organic solvents.

Asphalt is a viscoelastic material which means it exhibits both viscous and elastic behavior and displays a time dependent relation between an applied stress and the resultant strain. Thus when testing asphalt it is common to refer to the rheological properties as measured by dynamic testing procedures. Rheological testing machines subject a test cylinder of asphalt to a periodic or dynamic loading pattern involving a sinusoidal input on one end and measure the resulting response on the opposite end which now is out of phase with the input. Thus the shear modulus, $\ddot{G}^*$, has a real and an imaginary component, $G'$ and $G''$. The rheological results are usually expressed in terms of the following:

Loss tangent=tan (delta)=$G''/G'$

Complex shear modulus=$|\ddot{G}^*|=[(G')^{2}+(G'')^{2}]^{1/2}$

Dynamic viscosity=$eta^*=|\ddot{G}^*|/omega$ where delta is the phase angle and omega the applied strain frequency. See Ferry, *Viscoelastic Properties of Polymers*, John Wiley, N.Y. 1961; or Goodrich, "Asphalt and Polymer Modified Asphalt Properties Related to the Performance of Asphalt Concrete Mixes," *Asphalt Paving Technology* 1988, 57, pp 116–126, Viking Press, Eden Prairie, Minn., 1988. Properties of asphalt binders with and without modifiers generally are expressed in these theological terms.

SUMMARY OF INVENTION

A purpose of the subject invention is to overcome the deficiencies of the above mentioned prior art.

It is among the objects of this invention to provide an advanced two-step thermal process for co-recycling tires and oils whereby glass and steel fibers in tires are segregated from gaseous, liquids, and solid carbonous residues inside the screw reactor system. Here carbonous represents a state-of-the-art term employed in the field of asphalt materials to indicate largely carbon containing. Conversely carbonaceous implies carbon containing without any indication of how much carbon is present.

Another object of this invention is to process larger tire particulates including whole tires to minimize shredding costs and difficulties associated with separation of glass and steel fibers from other tire components.

It is another object of this invention to process tires in the presence of different oil sources, that is waste motor oils, waste industrial oils, various refinery stocks, and residuum, to produce a unique carbonous residue characteristic of the chemistry of the oil used in the process.

It is still another object of this invention to incorporate additives into the two-step thermal process whereby formation of gaseous products including hydrogen sulfide are reduced, production of light product oils are maximized and said product oils contain negligible amounts of chlorinated materials. Light product oils produced in the presence of selective additives exhibit increased hydrogen content and decreased aromatic, nitrogen, sulfur, and oxygen contents as well as a decrease in specific gravity. Carbonous residues produced in the presence of selected additives exhibit increased adhesive properties with organic, inorganic and metallic surfaces.

It is another object of this invention to produce a carbonous residue lacking coke- or carbon-like characteristics, which are largely inorganic in nature, thereby producing a carbonous surface that exhibits organic carbonaceous characteristics.

Still another and more specific object of this invention is to produce a carbonous residue modifier for bituminous binders that reinforces the viscoelastic properties of the binder, enhances the shear and temperature susceptibility characteristics of binder flow properties, reduces levels of oxidative aging and long-termed embrittlement processes and in bituminous mixtures reduces the detrimental effects of rut and crack formation and moisture damage.

Another object of this invention is to improve the deicing characteristics of Portland concrete surfaces by darkening the concrete to permit increased absorption of solar energy.

It is still another object of this invention to reduce the porosity and permeability in Portland concretes by incorporating small amounts of carbonous residues into concrete mixes to reduce penetration of substances that impart undesirable effects to the concrete or to the steel reinforcing structures imbedded in the concrete.

Yet another object is to add carbonous residues as produced from the two-step thermal process mentioned above to Portland concrete to improve its adhesive properties to oily metallic surfaces.

Another object is to moderate the rate of drying and curing properties of concrete to lessen formation of micro fractures during the initial stages of drying by controlling the amount of wetting agent used with the carbonous residue.

These and other objects will become apparent from the discussions found hereinafter.

DETAILED DESCRIPTION OF INVENTION

The reactor system for processing scrap tires evolved several steps. The preliminary design information for the pilot plant process of FIG. 1 was obtained by utilizing a conventional laboratory batch autoclave. In particular the unique properties of the carbonous residue were investigated to design testing procedures for the continuous pilot plant data accumulation.

Figure 1:
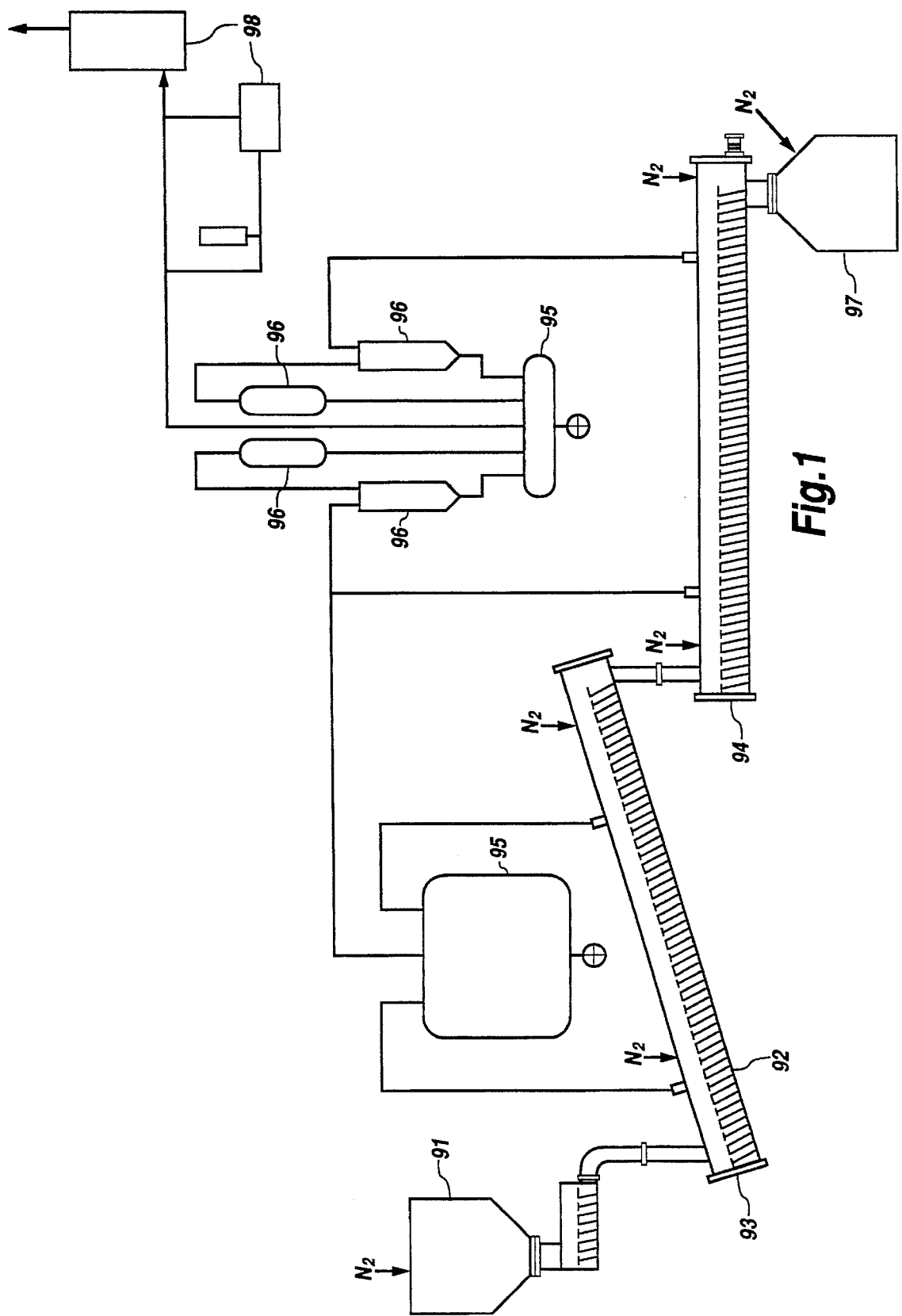
FIG. 1 shows a simplified recycle process.

The two-step continuous reactor shown in FIG. 1 consists of several basic physical units. A tire feed hopper 91 feeds tires into a digesting oil 92 which occupies the lower region of an inclined screw reactor 93 whose upper portion serves as a retort. A horizontal screw reactor 94 serves as a curing/drying reactor. Liquid product receiver vessels 95 collect product light oil both before and after condensers 96. A solid product receiver vessel 97 collects carbonous reside product. A gas measurement system 98 monitors the process, and nitrogen bleed enhances vapor recovery. Without employing the curing/drying reactor a carbonaceous material is produced that contains considerable, up to about ten weight percent, residual light oil. A better carbonaceous material product, now referred to as carbonous residue, is produced if the curing/drying reactor lowers this residual oil concentration to below about one weight percent.

A more detailed explanation of the process involves the basic physical units: (1) tire feed hopper with variable speed drive feed screws, (2) oil feed system including overflow controls, (3) inclined screw reactor with variable speed drive for the feed screw, (4) horizontal screw reactor with variable speed drive for the screw, (5) liquid product receiver vessels, (6) solid product receiver vessel and (7) glass and steel fiber receiver vessels. Both screw reactors are constructed from non-symmetrical tubes which are electrically heated (8).

Tires (1) and oils (2) are transported via a horizontal and vertical feed screw to the first stage, primary inclined screw reactor (3). Injection or mixing of additives described below are optional. Function of said reactor is to digest tires with oils in the temperature range of about 600°–750° F. and begin separation of glass and steel fibers from the rest of tire components. Retorting process reaching a maximum temperature in the range of about 800°–875° F. occurs in the upper section of said reactor. Volatile or light components, comprising product gases and liquids, exit the reactor via two outlets where they are condensed and stored (5) or combusted for fuel.

Oil (2) types processed in this invention include waste motor oil (WMO), new 600w cylinder oil (NCO), trim gas oil (TGO), vacuum heavy bottoms (VHB), and decanted oils (DO). Other sources of oils or residuum are potentially usable with appropriate changes in reactor operating conditions. None of the product oils are recycled through the reactor system.

The second stage horizontal reactor (4) processes generally in the range of about 800° to 900° F. carbonous residues to have an oil content in the range of 0.1 to 1.0 wt %. Gas and liquid product outlets are provided as in the first stage reactor.

Inclined (3) and horizontal (4) screw reactors incorporate an approximate elliptical configuration (8) which allows segregation of fine carbonous residues from glass and steel fibers. Fibers move along the top of the feed screw and the carbonous residue moves along the bottom edge of the reactor. Glass and steel fibers are collected in fiber receiver tanks (7) located at the ends of each reactor. Carbonous residue particulates are collected in a product receiver vessel (6) connected near the end of the second stage reactor. The vessel is heated at the same temperature as the second stage reactor.

Product enhancing additives selected from calcium carbonate, calcium hydroxide, calcium oxide, magnesium carbonate, magnesium oxide, magnesium hydroxide, dolomite, sodium carbonate, sodium hydroxide, potassium carbonate, potassium hydroxide, iron oxide, bauxite, red mud, and combinations thereof, but preferably consisting of calcium oxide, calcium hydroxide, magnesium oxide or magnesium hydroxide, when added to the retorting process reduce gas formation and hydrogen sulfide emissions in the gas stream, increase product oil yields and quality and stabilize product oils to ambient oxidation processes, minimize level of chlorinated substances in the product oil and impart anti-oxidant, anti-stripping, and improved internal bonding qualities to carbonous residues when used as a modifier for asphalt or bituminous binders. The term red mud refers to the byproduct left after the aluminum processing of bauxite, and like bauxite, contains a number of metal oxides but normally is rich in iron oxide resulting in its name. A further benefit of the incorporation of said additives into the carbonous residue is the elimination of hydrogen sulfide from the product gas and chlorinated compounds from the product light oil without generating adsorbents that require external disposal.

The carbonous residue is a state-of-the-art term of asphalt materials. The general term is carbonaceous material referring to a material having carbon-like properties. The carbonous residue is a subcategory of carbonaceous material relating to carbon-like properties of an organic nature, such as aromatics, in contrast to carbon-like properties of an inorganic nature, such as coke.

Figures 2, 2A:
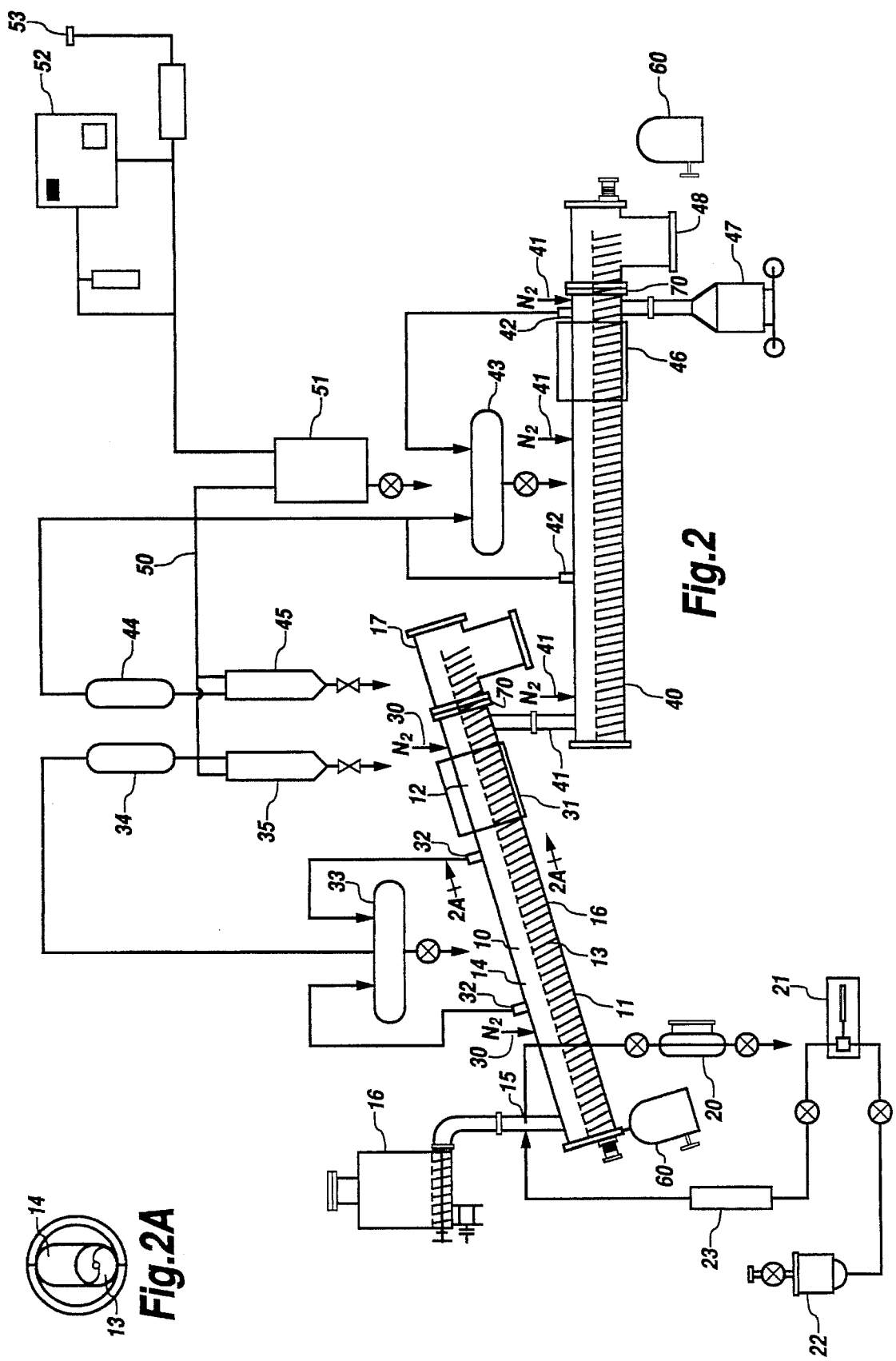
FIG. 2 shows a pilot plant scrap tire process flow sheet.

A more detailed flow sheet of the continuous pilot plant process, as shown in FIG. 2, represented a primary special designed inclined screw reactor 10 with a lower tire digesting oil section 11 and an upper retorting section 12. The reactor chamber cross-section A—A was a special design non-spherical, approximately elliptical, shape with the screw 13 in the bottom to auger the oil and solids with space on top 14 for the nondigestable tire components to move. The oil level inlet and overflow 15 was maintained by a controller 20 fed by a oil pump 21 removing oil from a reservoir 22. The oil was preheated 23 before entering the reactor at the position of tire feeding 16, which also included additives, from a vapor-trapped scrap tire reservoir. Purge or bleed gas, usually nitrogen, 30 entered above the oil level and also past the retorting heater 31. The vapors left the primary reactor through several ports 32 entering first a knock-out drum 33 before going into a condenser 34 and light-oil collector 35. For the primary reactor a transition section 16 existed between the oil level and the retorting section 12 indicated by the retorting heater 31. After the retorting section 12 the solids were augered to pass through a feeder 41 into the curing/drying reactor 40. Additionally the tire cords are augered out the primary reactor end 17 and fall 18. Alternatively a vibrating screen is employable to enhance solids recovery.

The curing/drying reactor 40 was physically similar to the primary reactor 10 with an open-spaced screw, similar to cross-section A—A but since only a small amount of glass and steel fibers remain the open space 14 was potentially smaller. The curing/drying reactor 40 had purge gas 41 at multiple locations which leaves through multiple ports 42 passing into a knock-out drum 43 and then a condenser 44 into a light oil collector 45. The final overhead 50 from the light oil collectors passed through a low temperature condenser 51, through a gas sampling station and was vented 53. The horizontal curing/drying reactor 40 was heated after which the solid product carbonous residue dropped into a collector 47. Any separated glass and steel fibers drop down 48. Alternatively a vibrating screen is employable. In both reactors vapor seals 70 were employed.

Both inclined screw reactors utilized a variable speed drive 60 for the augering mechanism allowing a change in residence time. The pitch of the screws was not critical since the variable speed drive was the control for the rate of movement of material; a half-pitch was commonly employed. The primary reactor 10 operated in the range of from 10 to 20 degrees incline while the curing/drying reactor 40 normally was near horizonal. The screw reactor speed was usually in the range of 1.2 to 2.0 rpm with many runs at 1.5 rpm. Both reactors were constructed of 4-inch carbon steel 10-foot in length. To make the approximately elliptical internal shape, 5-inch steel pipe was split and an appropriate piece welded as shown in section A—A.

It is believed the invention will be more fully understood by reference to the following specific examples which illustrate the beneficial effects attained with such process improvements and composite compositions.

EXAMPLE 1

Effect of Additives in Retorting Process

Additives selected from calcium carbonate, calcium hydroxide, calcium oxide, magnesium carbonate, magnesium oxide, magnesium hydroxide, dolomite, sodium carbonate, sodium hydroxide, potassium carbonate, potassium hydroxide, iron oxide, bauxite, red mud, and combinations thereof, but preferably consisting of calcium oxide, calcium hydroxide, magnesium oxide or magnesium hydroxide, were added to the retorting process. The term red mud refers to the byproduct left after the aluminum processing of bauxite, and like bauxite, contains a number of metal oxides but normally is rich in iron oxide resulting in its name.

The effect of calcium oxide additive in the retorting process was evident from data presented in Tables 1–2, which employed a retorting temperature of 850° F. and a curing temperature of 825° F. Similar trends were observed with other types of additives listed above. Additive injection rates, which were not critical since any excess ended up in the carbonous residue and generally gave it improved properties, ranged from about 0.4 to 1.5 lb/hr with 10-lb/hr tire feed rates and were preferably one to five moles of additive per mole of sulfur, calculated as elemental sulfur, contained in the waste tires. Weight ratio of tire to oil ranged from 0 to about 3.5. Product gas compositions were determined as shown in Table 1. Calcium oxide addition caused a marked increase in hydrogen gas formation and a dramatic reduction in carbon dioxide formation. The absence of hydrogen sulfide in the calcium oxide data column was significant. Additive additions to the retorting process increased the heating and economic value of product gases produced.

Product oil yields based on retorting tire-WMO with and without said additives are listed in Table 2. Oil yield is increased by approximately 12 percent when calcium oxide was added to the retorting process. Table 3 reported product light oil properties based upon retorting tire-WMO with and without said additives. Addition of CaO improved the quality and value of this product light oil by increasing its hydrogen content and decreasing its aromatic carbon, hydrogen, sulfur, and oxygen contents and specific gravity. Further these product light oil property improvements were achieved without the need to separate and/or regenerate a catalyst. The effects of CaO

TABLE 1

| Product Gas Composition | | |
|---|---|---|
| | Volume % | |
| Component | Tire-WMO | Tire-WMO-CaO |
| $H_2$ | 15.4 | 41.7 |
| $CO_2$ | 16.8 | 2.4 |
| $CH_4$ | 29.6 | 29.3 |
| $C_2H_2$ | 12.2 | 11.1 |
| $C_2H_4$ | 10.1 | 6.8 |
| $C_3H_6 + C_3H_6$ | 6.3 | 4.5 |
| $C_4$'s | 9.1 | 4.2 |
| $H_2S$ | 0.5 | 0.0 |

TABLE 2

| Product Oil Yields | | |
|---|---|---|
| | Volume % | |
| Product | Tire-WMO | Tire-WMO-CaO |
| Oil | 54.9 | 65.7 |
| Residue | 29.7 | 22.1 |
| Gas + Loss | 15.4 | 12.2 |

TABLE 3

| EFFECTS OF ADDITIVES ON LIGHT OIL PROPERTIES | | | |
|---|---|---|---|
| Product Oil Property | Tire-WMO (Exp. DR-9) | Tire-WMO-CaO (Exp. CAO-1) | Tire-WMO-CaO (Exp. CAO-4) |
| Atomic H/C Ratio | 1.55 | 1.64 | 1.68 |
| Aromatic Carbon (%) | 31.3 | 23.2 | 19.7 |
| Nitrogen (wt %) | 0.34 | 0.21 | 0.20 |
| Sulfur (wt %) | 0.71 | 0.65 | 0.60 |
| Oxygen (wt %) | 1.42 | 1.15 | 0.37 |
| Specific Gravity | 0.9111 | 0.9052 | 0.8959 | on the product light oil yield and properties add to the economics of the process. Differences in residue contents were attributed to type of tires charged to the reactor since sidewall and thread or rib sections contained different amounts of glass and steel fibers.

Another significant finding that relates directly to the effect additive addition had on product properties was the near absence of chlorinated substances in the product oil after the reactor reached steady state operating conditions. Waste oils having a level of chlorinated materials, identified by the initial elemental chlorine content, of about 700–1000 parts per million, or ppm, were easily reduced by the two-step thermal process to levels below about 5 ppm for the product light oil. Thus, the economic value of the oil and ease of hydrorefining was much greater than from similar oils produced by pyrolyzing tires at conventional higher temperatures in the 900°–1400° F. range where their chloride contents were substantially higher.

A tire-WMO product oil was hydrotreated between about 600°–750° F. using a commercial liquefaction catalyst. No difficulties were encountered. Sulfur content was decreased from 1.1 to less than about 0.2 wt % in all five samples hydrotreated and as low as 0.08 wt % in two samples hydrotreated at 700° and 750° F. Nitrogen content remained constant at 0.03 wt % while carbon and hydrogen ratios did not change appreciably.

EXAMPLE 2

Preparation of Modified Bituminous Binders

A base composition of bituminous binder modified with carbonous residue was formulated with 10 wt %, <325 mesh size carbonous residue blended into AC-10 bituminous binder or asphalt; however for many situations as little as 5 wt % carbonous residue is adequate. For mixing laboratory size specimens, glass vials sealed with a cone-shaped Teflon stopper-cap assembly, were thermally treated for 2-hours in a large aluminum block representing a thermal sink and maintained at 150° C. At the end of each hour the block assembly housing the vials was mechanically shaken for 5-minutes in a paint shaker. After final shaking, vials were removed from the block and cooled to ambient temperature without agitation for two hours before commencing any tests. When larger quantities of modified binder were prepared the heating/mixing period was extended accordingly. Microscopic examination of modified binders showed ultra-fine uniform dispersion of <325 mesh size carbonous residue prepared from reactor operating conditions specified earlier. Conversely pyrolyzed tire residue, largely carbon black, with much harder particulates showed uneven, clumpy or foreign body type dispersion characteristics in binders. Uniform dispersion of residue particulates was an important factor when modifying bituminous binders.

Cone-shaped Teflon stoppers used above remained totally covered with binders containing tire-WMO carbonous residue and to lesser extent with corresponding residues from TGO or VHB residuum. With commercial unmodified binders the Teflon stoppers were only partially coated. This observation illustrated improved adhesion characteristics of carbonous residue-modified binders with surfaces that normally were not responsive to binder coatings.

EXAMPLE 3

Rheological Properties of Carbonous Residue-Modified Binders

Table 4, which employed a retorting temperature of 850° F. and a curing temperature of 825° F. for the carbonous residue, illustrated resultant changes in theological behavior at 25° C. for various carbonous residue-modified AC-10 binders A and B. Viscosity changes were indicative of the chemistry of the carbonous residue. For example DO and TGO carbonous residues had more aromatic characteristics than WMO carbonous

TABLE 4

Viscosity of Unmodified and Modified Binders

| Binders | 10 wt % Modifier | Viscosity, 25° C. ×10$^5$, Poise A | B | % Change in Viscosity A | B |
|---|---|---|---|---|---|
| A | (B) | None | 7.08 | 22.06 | — | — |
| A | (8) | WMO | 12.06 | 26.40 | 54.6 | 30.3 |
| A | (s) | TGO | 10.46 | 26.31 | 34.1 | 20.9 |
| A | (B) | VHB | — | 39.32 | — | 94.1 |
| A | (B) | DO | 9.20 | — | 17.9 | — |
| A | Pyrolyzed Tire Residue | | 10.06 | | 41.8 | — |

TABLE 5

Aging Properties of Unmodified and Modified Binders

| Binder | 10 wt % Modifier | Aged | Viscosity Poise ×10$^5$, 25° C. | ×10$^8$, 10° C. | % change in viscosity 25° C. | 10° C. |
|---|---|---|---|---|---|---|
| C | None | No | 20.3 | 0.20 | | |
| C | None | Yes | 53.8 | 0.65 | 165 | 225 |
| C | WMO-Lime | No | 30.4 | 0.45 | | |
| C | WMO-Lime | Yes | 70.7 | 1.01 | 133 | 124 |
| C | WMO-CaO | No | 32.7 | 0.44 | | |
| C | WMO-CaO | Yes | 77.6 | 1.02 | 137 | 132 |
| C | DO | No | 25.3 | 0.35 | | |
| C | DO | Yes | 87.7 | 1.19 | 246 | 240 |
| C | DO-Lime | No | 24.5 | 0.38 | | |
| C | DO-Lime | Yes | 86.0 | 1.21 | 251 | 218 |

TABLE 6

Long-Termed Embrittlement of Unmodified and Modified Binders

| Binder | 10% Modifier | Cure, 25° C. hours | Viscosity 25° C. × 10$^5$, Poise | % change in Viscosity |
|---|---|---|---|---|
| D | None | 2 | 7.08 | — |
| D | None | 4514 | 10.90 | 39.2 |
| D | WMO | 2 | 12.10 | — |
| D | WMO | 4465 | 12.30 | 2.0 |
| D | WMO | 6526 | 14.60 | 20.8 |
| D pyrolyzed tire res | | 2 | 11.10 | — |
| D pyrolysed tire res | | 4513 | 15.80 | 42.9 |
| D pyrolyzed tire res | | 6528 | 16.70 | 50.8 | residue, which was more aliphatic, and decrease the reinforcing effects, that is an increase in viscosity, of the modification. Vacuum heavy bottom carbonous residue interacted strongly with binder B causing a substantial increase in viscosity.

EXAMPLE 4

Aging Characteristics of Unmodified and Modified Binders

Binder C samples were aged at 163° C. for 85 minutes in a glass tube rotating slowly inside a horizontal oven cavity. Sample size was 6 g and 300 mL/minute. Data in Table 5, with carbonous residue obtained under the conditions of Example 3, reported the effects derived from aging binder with different types of additives, preferably, but not limited to, calcium oxide, calcium hydroxide, magnesium oxide or magnesium hydroxide, incorporated into the retorting process and their effects on binder viscosity values at 25° and 10° C.; however, if non-additive retorting occurred, then less than three weight percent of such additives were well blended into the modified bituminous binder. Tire-WMO carbonous residue exhibited anti-oxidant behavior compared to DO and the control sample and further had improved internal bonding qualities. More importantly at 10° C. WMO residue had less of a viscosity increase than at 25° C., values of 133 vs 124%, indicating no adverse effects from addition of solid particles on low temperature flow properties. The WMO data also showed binder stiffness was increased and reinforced at higher service temperatures and improved at low service temperatures with values of 124% increase vs 225% increase at 10° C. for the control binder. With DO carbonous residue modified binders there was a substantial increase in viscosity after aging but the increases remained constant at both 25° and 10° C.

EXAMPLE 5

Embrittlement Characteristics of Unmodified and Modified Binders

Time dependent embrittlement of bituminous binders in roadways continues as a major factor affecting cost of maintaining such roadways. Table 6, with carbonous residue obtained under the conditions of Example 3, showed embrittlement properties of unmodified and modified AC-10 binder D after extended cure at 25° C. After 4500 hour cure unmodified binder hardness increased 39% compared to about 2% for tire-WMO residue and 43% for pyrolyzed tire residue (res.) which was largely carbon black. Comparisons of the two latter modified binders at 6500 hours cure showed 21 and 51% increases, respectively. Pyrolyzed tire residue in the binder promoted embrittlement whereas WMO residue retarded embrittlement. As indicated earlier, the chemistry of the WMO carbonous residue surface, having organic characteristics in contrast to inorganic characteristics, was designed to be compatible with the bituminous binder matrix.

EXAMPLE 6

Bituminous Binder Specification Tests

Unmodified and modified AC-10 binders D and E were subjected to standard ASTM specification test methods. Properties of these binders were listed in Table 7, with carbonous residue obtained under the conditions of Example 3. Forced ductility tests using a modified ASTM D-113 at 39.2° F. showed most of the carbonous residue modified binders tested had greater peak load values with maximum tensile strength and elongation, which was distance sample stretched, than the corresponding control or DO-lime samples. Although these results parallel those listed in Examples 3 and 4 whereby addition of carbonous residue modifier caused a stiffening effect in bituminous binders and the effect was residue dependent; it was again apparent that the type of oil used in

TABLE 7

ASTM Binder Specification Tests

| Binder | 10 wt % Modifier | ASTM D-2170 275° F. Visc. cst | ASTM D-5 39.2° F. Pen 200 g, 60 s, dmm | ASTM D-5 77° F. Pen 100 g, 5 s, dmm |
|---|---|---|---|---|
| D | None | 334.4 | 32.5 | 83.0 |
| D | WMO | 426.9 | 31.5 | 78.5 |
| D | WMO-Lime | 509.7 | 31.5 | 75.5 |
| E | DO-Lime | 391.8 | 37.0 | 85.0 |
| E | DO-CaO | 399.5 | 35.9 | 82.0 |

TABLE 8

Marshall Stability and Resilient Modulus Tests

| 10 wt % | Binder E Marshall Test | | Binder D Resilient Modulus | |
|---|---|---|---|---|
| Modifier | Stability, lb | Flow, 1/100 inch | 77° F. | 104° F. |
| None | 1878 | 14 | 379,504 | 18,862 |
| WMO | 1455 | 14 | 448,808 | 26,200 |
| WMO-lime | 1569 | 16 | 442,176 | 25,331 | the retorting process had a major influence on the properties of the resultant carbonous residue and its effect on bituminous binder properties.

EXAMPLE 7

Bituminous Mixture Specification Tests

Bituminous mixtures prepared from different carbonous residue-modified bituminous AC-10 binders D and E were prepared and tested in accordance with standard ASTM procedures used by state highway agencies in their mix design studies. A glacial gravel was used for both tests listed in Table 8, with carbonous residue obtained under the conditions of Example 3. Marshall data show all three specimens met required stability and flow values for medium traffic roadways even though the carbonous residue-modified binders had lower values. Results from resilient modulus test were opposite to those reported for the Marshall test. Carbonous residue-modified binder D had the higher modulus values at both test temperatures. Higher values relate to greater load carrying capabilities and less rut formation from load-induced stresses. These results were typical of those reported in previous examples.

Accelerated Rut Testing by the Georgia loaded-wheel tester on bituminous mixtures using binder E gave results that paralleled resilient modulus test results. The acceptable permanent deformation value after 8,000 cycles was 0.30 inches. Test deformation values were as follows: Control AC-10 binder: 0.27; DO-lime: 0.24; WMO-lime: 0.12; and WMO-CaO: 0.17 inches. Comparisons between WMO and DO carbonous residues show distinct differences which as mentioned earlier arise from the different chemistries of the residue surface.

Moisture sensitivity tests, measuring the amount of moisture damage, of numerous carbonous residue-modified binders and aggregate combinations were conducted using a freeze-thaw pedestal test described in H. Plancher et al, "Proceedings of Canadian Technical Asphalt Association," 25, pp 246–262 (1980) which herein is incorporated by reference. Results from this extensive investigation showed all unmodified binder-aggregate test specimens fractured in less than 8 repeated freeze-thaw cycles. Those prepared from tire-oil carbonous residues fractured between 4 to 12 cycles while those containing tire-oil-additive carbonous residue modifier invariably had no failures after 50 freeze-thaw cycles. Several of the aggregates were known from field studies to be susceptible to moisture damage. Pavements constructed from these aggregates require addition of anti-stripping agents to lessen the detrimental effects of moisture damage.

EXAMPLE 8

Portland Concrete Modification

Numerous Portland concrete test specimens were prepared in accordance with ASTM C-109 format, which defines common Portland cement. Specimens of cement composites for control containing about 0.5 to 5.0 wt % carbonous residue, obtained using the conditions of Example 3, were prepared for visual and mechanical examinations. Carbonous residues were treated by applying pre-wetting agents, such as commercial wetting agents or detergents, to avoid residue flotation problems in the concrete. In all instances test specimens containing carbonous residue required repeated taps with a hammer to dislodge them from the 2-inch cube molds while all unmodified concrete specimens dislodged as the mold was disassembled. Even though the molds were coated with different types of lubricants, the molds for unmodified concrete required little cleaning effort whereas, the molds containing carbonous residue-modified concrete were more difficult to clean and in some instances required a brass brush to remove residual concrete residues; thus, the carbonous residue-modified concrete showed improved adhesive properties with oily metallic surfaces. Visual examination of fractured specimens using a stereo microscope showed less microscopic air voids, and thus reduced porosity and permeability, caused by air entrainment for carbonous residues pre-wetted with commercial wetting agents and larger air voids in those containing carbonous residue pre-wetted with detergents. The latter also had slower curing or drying rates.

The above set out examples, while not meant to be limiting, demonstrate the dramatic improvement derived from using carbonous residues recovered from recycling tires and oils in a multiple-step reactor system as modifiers for bituminous binders and Portland concrete. These benefits are attained when operating in accordance with the present invention.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

We claim:

1. A bituminous binder composition of matter comprising:
   blending asphalt;
   carbonous residue, produced by the steps comprising: (1) digesting at a maximum temperature below about 750° F. waste tires using oil being selected from the group comprising residuum, new 600w cylinder oil, waste motor oil, trim gas oil, vacuum heavy bottoms, decanted oil, and combinations thereof; (2) mixing at least one additive, being selected from the group consisting of calcium carbonate, calcium hydroxide, calcium oxide, magnesium carbonate, magnesium oxide, magnesium hydroxide, dolomite, sodium carbonate, sodium hydroxide, potassium carbonate, potassium hydroxide, iron oxide, bauxite, red mud, and combinations thereof; (3) retorting at a maximum temperature below about 875° F. to remove light components while retaining said carbonous residue; and wherein said carbonous residue is within the range of about five to ten weight percent of said binder; and
   at least one additional additive selected from the group comprising calcium oxide, calcium hydroxide, magnesium oxide, magnesium hydroxide, and combinations thereof, wherein all total additives are within the range of about up to about three weight percent of said binder.

2. The bituminous binder according to claim 1 wherein said at least one additional additive further comprises being selected from the group consisting of calcium carbonate, calcium hydroxide, calcium oxide, magnesium carbonate, magnesium oxide, magnesium hydroxide, dolomite, sodium carbonate, sodium hydroxide, potassium carbonate, potassium hydroxide, iron oxide, bauxite, red mud, and combinations thereof.

3. The bituminous binder according to claim 1 wherein said at least one additional additive further comprises a compound initially present in said carbonous residue.

4. The bituminous binder according to claim 1 possessing improved anti-stripping qualities related to moisture damage.

5. The bituminous binder according to claim 1 possessing improved rheological properties being selected from the group consisting of age, embrittlement, and combinations thereof.

6. The bituminous binder according to claim 5 wherein said improved theological properties further comprise simultaneous improvement in both age and embrittlement.

7. The bituminous binder according to claim 1 comprising a uniform dispersal of said carbonous residue.

8. The bituminous binder according to claim 1 possessing reinforcing viscoelastic properties.

9. The bituminous binder according to claim 1 possessing improved rheological flow properties at low binder service temperatures.

10. The bituminous binder according to claim 1 possessing improved rheological flow properties at high binder service temperatures.

11. The bituminous binder according to claim 1 further comprising coating said binder on aggregate producing an asphalt-aggregate mixture.

12. The asphalt-aggregate mixture according to claim 11 possessing less susceptibility to permanent deformation.

13. The asphalt-aggregate mixture according to claim 11 possessing improved anti-stripping qualities related to moisture damage.

14. The asphalt-aggregate mixture according to claim 11 possessing improved theological properties being defected from the group comprising age, embrittlement, and combinations thereof.

15. The asphalt-aggregate mixture according to claim 11 possessing improved theological properties consisting simultaneous improvement in age and embrittlement.

* * * * *